United States Patent [19]

Stubbs

[11] Patent Number: 5,725,007
[45] Date of Patent: Mar. 10, 1998

[54] VALVE MECHANISM AND METHOD FOR MAKING SAME

[76] Inventor: William L. Stubbs, 4705 Huasna Rd., Arroyo Grande, Calif. 93420

[21] Appl. No.: 499,412

[22] Filed: Jul. 7, 1995

[51] Int. Cl.$^6$ .................................................. F16L 55/18
[52] U.S. Cl. ........................ 137/15; 137/329.01; 251/359
[58] Field of Search ............................. 137/15, 315, 329, 137/329.01

[56] References Cited

U.S. PATENT DOCUMENTS

| | | |
|---|---|---|
| 107,153 | 6/1870 | Cockburn et al. |
| 217,705 | 10/1879 | Jarrett . |
| 814,063 | 3/1906 | Morgan . |
| 933,863 | 9/1909 | Thompson . |
| 970,281 | 9/1910 | Nostran . |
| 1,316,585 | 9/1919 | Logan . |
| 1,844,528 | 2/1932 | Smith . |
| 1,996,309 | 4/1935 | Simpson ........................ 251/31 |
| 2,051,350 | 8/1936 | Smith ............................ 251/31 |
| 2,213,998 | 9/1940 | Sifkovitz ....................... 251/29 |
| 2,358,785 | 9/1944 | Blizard ......................... 122/479 |
| 2,362,438 | 11/1944 | Marsh .......................... 251/31 |
| 2,448,429 | 8/1948 | Henry ........................... 137/53 |
| 2,457,492 | 12/1948 | Raybould ....................... 251/159 |
| 2,527,381 | 10/1950 | Clair ............................. 137/53 |
| 2,629,576 | 2/1953 | Rudolph ........................ 251/31 |
| 2,969,218 | 1/1961 | Shaw ............................ 251/333 |
| 3,067,978 | 12/1962 | Natho ........................... 137/315 |
| 3,198,481 | 8/1965 | Bryant .......................... 251/210 |
| 3,354,831 | 11/1967 | Acker et al. ................... 103/44 |
| 3,451,423 | 6/1969 | Priese ........................... 137/556 |
| 3,529,622 | 9/1970 | Weise et al. .................. 137/329.02 |
| 3,605,793 | 9/1971 | Kinsel .......................... 137/329.06 |
| 3,765,448 | 10/1973 | Dussia .......................... 137/553 |
| 3,874,636 | 4/1975 | Bake et al. .................... 251/335 A |
| 3,947,942 | 4/1976 | Blocker ......................... 137/15 |
| 4,135,545 | 1/1979 | Fowler et al. ................. 137/315 |
| 4,161,278 | 7/1979 | Klann et al. .................. 236/56 |
| 4,171,792 | 10/1979 | Bass ............................. 251/335 A |
| 4,197,357 | 4/1980 | Danko .......................... 251/331 |
| 4,606,374 | 8/1986 | Kolenc et al. ................. 137/556.3 |
| 4,671,490 | 6/1987 | Kolenc et al. ................. 251/335.2 |
| 4,732,363 | 3/1988 | Kolenc et al. ................. 251/335.2 |
| 4,750,709 | 6/1988 | Kolenc et al. ................. 251/335.2 |

(List continued on next page.)

FOREIGN PATENT DOCUMENTS

| | | | |
|---|---|---|---|
| 654060 | 12/1962 | Canada ........................... | 251/59 |
| 1196182 | 11/1959 | France ............................ | 5/3 |
| 7407994 | 12/1974 | Netherlands .................... | 1/38 |
| 1000201 | 1/1957 | Sweden .......................... | 39/1 |
| 1076458 | 2/1960 | Sweden . | |

OTHER PUBLICATIONS

Steger, D.J., "Actuator With Wall Flexure Control," IBM Technical Disclosure Bulletin, Aug. 1972, vol. 15, No. 3, p. 989.

Primary Examiner—A. Michael Chambers
Attorney, Agent, or Firm—Hickman Beyer & Weaver

[57] ABSTRACT

A diaphragm valve including a main valve body and a ring member welded to the main valve body, and a flexible diaphragm having an outer periphery welded to the ring member. The weldment between the main valve body, the ring member, and the diaphragm, provide a hermetic seal for the chamber cavity of the diaphragm valve. The diaphragm may include an inner periphery welded to an axially movable valve member, also for providing a hermetic seal of the chamber cavity. In other embodiments, the outer periphery of the diaphragm is clamped to seal the chamber cavity by a bonnet being welded to the valve body.

A seal arrangement includes a groove provided in a surface surrounding a port, and an elastic sealing material disposed in the groove. The sealing material includes a portion extending out of the groove, and the groove and sealing material are configured so as to provide a void between the extending portion and the sidewall portions of the groove such that material may elastically fill the void when it is engaged by a valve member, and such that it may return to its original shape upon disengagement of the valve member without substantial permanent deformation.

20 Claims, 10 Drawing Sheets

U.S. PATENT DOCUMENTS

| | | | |
|---|---|---|---|
| 4,760,990 | 8/1988 | Kerger et al. | 251/335.2 |
| 4,867,201 | 9/1989 | Carten | 137/625.18 |
| 4,909,269 | 3/1990 | Pritchard et al. | 137/71 |
| 4,915,353 | 4/1990 | Danko | 251/331 |
| 5,004,011 | 4/1991 | Linder et al. | 137/556 |
| 5,083,750 | 1/1992 | Balik | 251/335.2 |
| 5,112,027 | 5/1992 | Hanyu et al. | 251/331 |
| 5,228,472 | 7/1993 | Ougiya et al. | 137/312 |
| 5,295,662 | 3/1994 | Yamaji et al. | 251/331 |
| 5,335,691 | 8/1994 | Kolenc | 137/312 |

VALVE MECHANISM AND METHOD FOR MAKING SAME

TECHNICAL FIELD

The present invention relates to the valve art in general. More particularly, the invention relates to an improved diaphragm valve and to improvements in valve seals and valve diaphragms.

BACKGROUND ART

Diaphragm valves of known types typically include a main valve body defining a valve cavity and inlet and outlet passages communicating with the valve cavity. A flexible metal diaphragm is mounted to the valve body in order to provide a hermetic seal for the valve cavity. Metal diaphragm valves are often used in systems handling purified fluids, since the diaphragm is able to provide total hermetic sealing between the valve cavity (process side) and the valve operating mechanism. Metal diaphragm valves are frequently employed in the semiconductor manufacturing industry.

In some diaphragm valves, the flexible diaphragm is a thin metal circular disk having its outer periphery attached to the valve body by clamping. A bonnet member is screwed into the valve body so as to hold or clamp the disk outer periphery between the bonnet member and the valve body. A valve operating stem is arranged for axially pushing a central portion of the circular diaphragm disk to directly or indirectly engage the inlet passage of the valve body.

In other diaphragm valves, the flexible diaphragm is a thin metal annular disk through which the valve operating stem extends. The annular disk diaphragm has its outer periphery attached to the valve body and its inner periphery attached to the valve operating stem. U.S. Pat. No. 4,671,490 describes a diaphragm valve of this type in which the valve operating stem extends through the annular diaphragm disk and includes a main stem and a stem tip connected to the main stem. The annular disk outer periphery is welded to the valve body and clamped to the valve body by a threaded bonnet screwed into the valve body, while the annular disk inner periphery is welded to the stem tip of the valve operating stem and clamped between the stem tip and the main stem.

As is apparent, the manner in which the diaphragm is mounted in diaphragm valves is important since failure of the diaphragm connections will result in leaking, which could result in the release of dangerous or damaging fluids. Attempts to improve the diaphragm mounting have significantly increased the complexity and cost associated with the overall valve structure and its manufacture.

Diaphragm valves including bonnets which are screwed into valve bodies for clamping diaphragms require expensive high-precision machined parts. During assembly, a precise torque must be applied to the threaded bonnet in order to adequately clamp the diaphragm outer periphery to the valve body. If the applied torque is too small, the coupling of the diaphragm outer periphery may not sufficiently seal the valve chamber cavity, and if the torque is too large, the diaphragm may be damaged which would also lead to sealing failure. The threaded bonnet can also permit contamination to enter the valve's working mechanism. Furthermore, conventional diaphragm valves frequently are manufactured with a large number of complex parts which lead to increased manufacturing and assembly costs, and which may increase the opportunity for valve failure.

What is needed is a diaphragm valve having a reliably sealed valve chamber cavity but which is easy and inexpensive to manufacture and maintain.

DISCLOSURE OF THE INVENTION

According to one aspect of the subject invention, there is provided a new and improved diaphragm valve construction including a bonnet covering a diaphragm and being non-releasably coupled to the valve body by at least one weld such that the diaphragm is non-releasably secured within the bonnet. In one embodiment, the bonnet is welded directly to the valve body such that the bonnet clamps the diaphragm outer periphery to a clamping surface of the valve body to provide hermetic sealing for the valve chamber cavity. In another embodiment, the valve body includes a ring member to which the diaphragm outer periphery is welded and the bonnet is in turn welded to the ring member.

According to this aspect of the invention, an all-welded diaphragm valve construction is provided to connect the diaphragm outer periphery in the valve body for providing a hermetic seal for the valve chamber cavity. The all-welded construction eliminates the use of complicated and expensive threaded bonnet/valve body assemblies, and permits an extremely reliable diaphragm valve to be inexpensively manufactured with a reduced number of parts and/or with simplified procedures.

According to a further aspect of the present invention, there is provided a diaphragm valve which includes a flexible diaphragm having an outer periphery welded to a ring member. The ring member is welded to a main valve body thereby forming the valve chamber cavity defined by the main valve body, the ring, and the diaphragm. In this manner, the weldment comprising the main valve body, the ring member, and the diaphragm, provide a reliable hermetic seal for the valve chamber cavity, while the use of threaded bonnet/valve body assemblies for clamping the diaphragm outer periphery is eliminated.

Advantageously, the outer periphery may first be welded to the ring member, and then the ring member is welded to the valve body. The weld between the ring member and the diaphragm outer periphery consequently is positioned substantially inside the valve chamber cavity. In one preferred embodiment, the ring member includes an internally projecting flange, and the outer periphery of the diaphragm is welded to the ring member such that the ring member flange is arranged over a face of the diaphragm opposed to the valve chamber cavity. The diaphragm may also include an outer rim at the outer periphery and an outer flange extending from the outer rim, and the outer flange is welded to the ring member.

According to another aspect of the invention, there is provided a diaphragm valve which includes a flexible annular diaphragm having an outer periphery welded to a ring member and an inner periphery welded to a valve member extending through the central axis of the annular diaphragm. The ring member is welded to a main valve body. The weldment comprising the main valve body, the ring member, the diaphragm, and the valve member provide a reliable hermetic seal for the valve chamber cavity, while the use of threaded bonnet/valve body clamping assemblies is eliminated.

According to further aspects of the invention, a number of improved diaphragm structures are provided. One diaphragm structure includes a plurality of concentric ridges and valleys to provide a corrugation which allows the diaphragm to be made of thicker material and still retain flexibility. Other diaphragm structures include an outer periphery rim and an outer flange extending from the outer rim or an annular-shaped diaphragm having an inner periphery rim and an inner flange extending from the inner rim.

The inner and outer flanges may be welded to cylindrical surfaces respectively of a movable valve member and a valve ring member. The flange weldments provide improved coupling of the diaphragm in the valve, while the corrugation provides an improved load resistance of the diaphragm in the valve.

Still according to another aspect of the invention, there is provided a new and improved valve assembly having a circumferential groove provided in a surface of the valve body surrounding a port, and an elastic sealing material which is at least partially disposed in the circumferential groove and which includes an extension portion partially extending from the circumferential groove past the valve body surface. The circumferential groove is configured to provide a void between the extension portion and sidewall portions of the groove such that material of the extension portion can at least partially fill the void when a valve member engages the extension portion and such that the extension portion can return substantially to its original configuration when the valve member disengages the extension portion. The sealing material is allowed to elastically deform in the void between the sealing material extension portion and the groove sidewall portions when the valve member is closed, and the sealing material returns to its original shape when the valve member is open without the occurrence of any significant permanent plastic deformation which leads to a long life of the sealing arrangement.

These and other advantages of the present invention will become clear to those skilled in the art upon a study of the following detailed description of the invention and of the several figures of the drawings, in which like elements are numbered alike and which show the preferred embodiments of the invention and which are not intended for the purpose of limiting same.

BEST MODES FOR CARRYING OUT THE INVENTION

Figure 1:
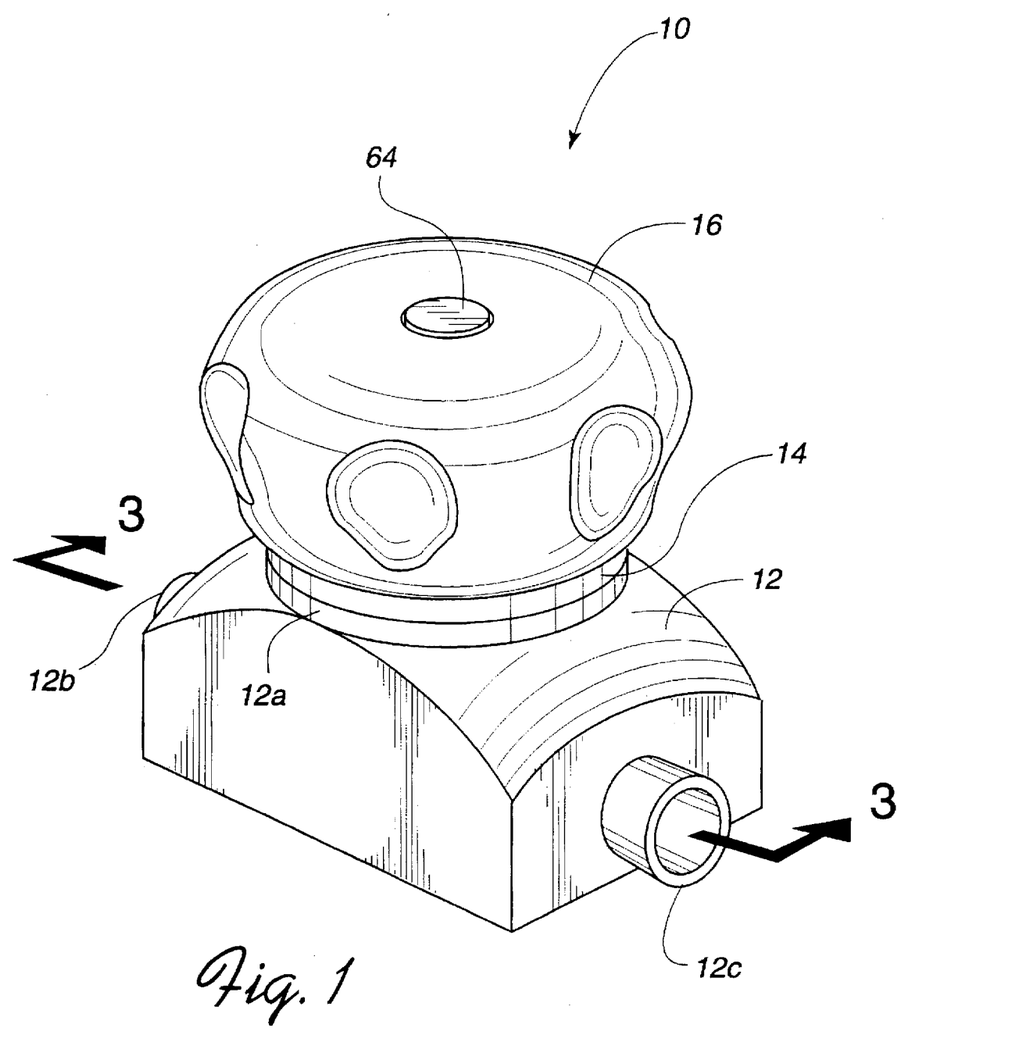
FIG. 1 is a perspective view of one embodiment of a diaphragm valve in accordance with the present invention.
Figure 2:
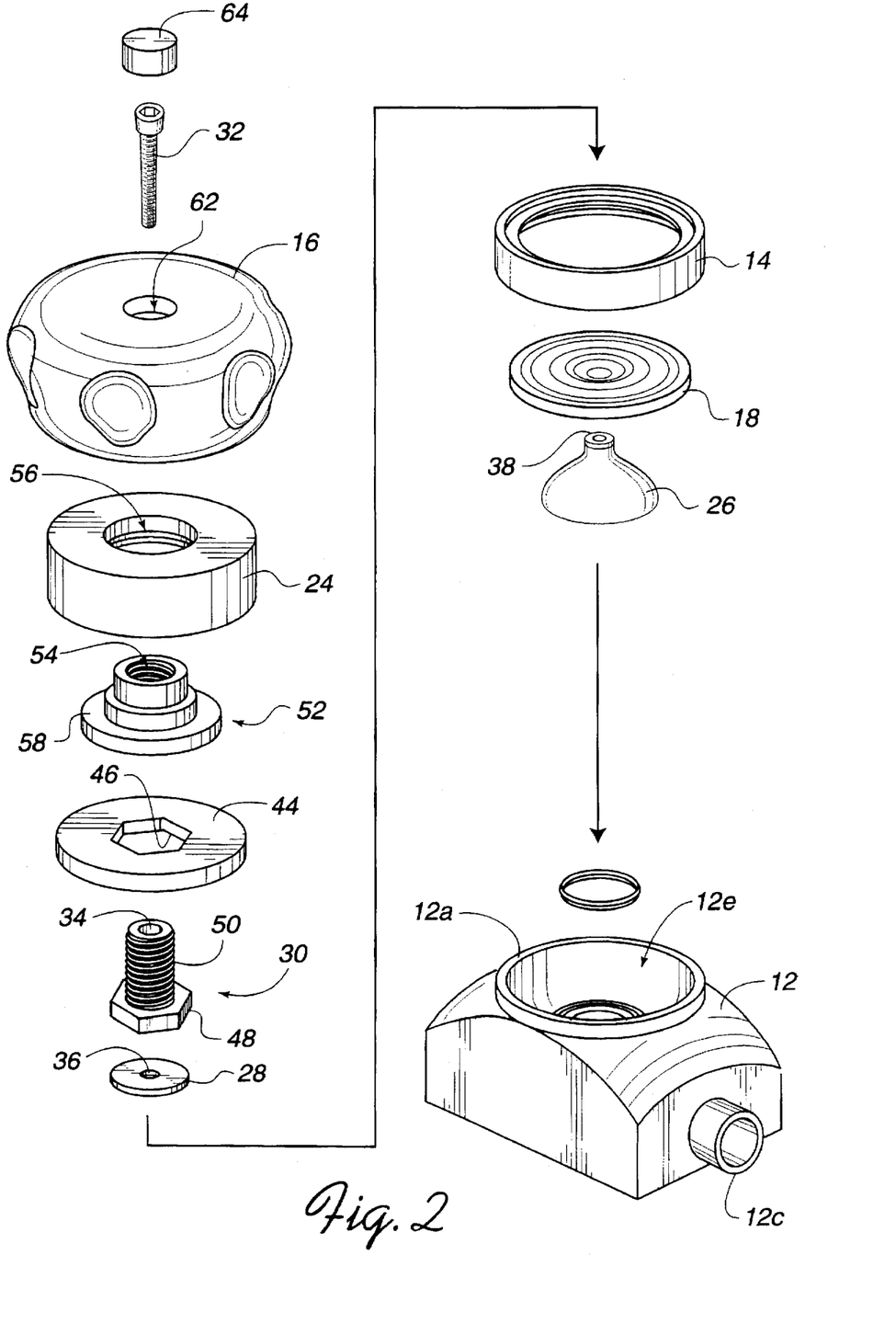
FIG. 2 is an exploded isometric view showing the various parts of the diaphragm valve of FIG. 1.
Figure 3:
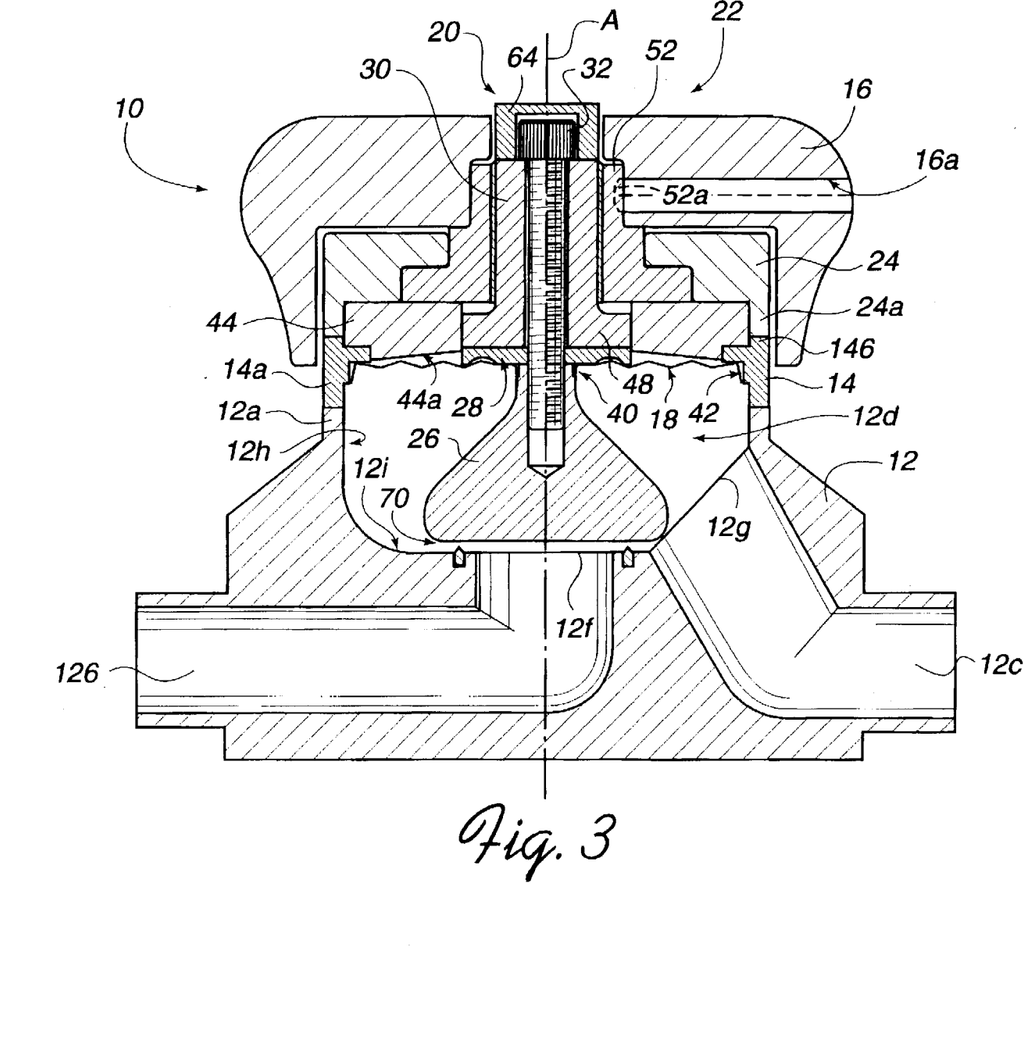
FIG. 3 is a cross-sectional side elevation taken along line 3—3 of FIG. 1, with the valve member in a center position.

Referring to FIGS. 1, 2 and 3, a diaphragm valve 10 according to one aspect of the invention includes a main valve body 12, a ring member 14, and a handle 16. Diaphragm valve 10 further includes a flexible annular diaphragm 18, an elongated valve member 20, a valve drive mechanism 22, and a bonnet 24.

Ring member 14 is welded to main valve body 12 and together therewith substantially forms the valve body for diaphragm valve 10, while handle 16 is rotatably associated with the valve body for operating diaphragm valve 10 in a manner described in more detail hereinafter. Main valve body 12 is provided with a cylindrical flange 12a, while ring member 14 also includes a cylindrical flange 14a which is aligned and welded with flange 12a.

Main valve body 12 is further provided with an inlet passage 12b and an outlet passage 12c, and a chamber cavity 12d having an open mouth 12e. Inlet passage 12b communicates with chamber cavity 12d at a first port 12f, while outlet passage 12c communicates with chamber cavity 12b at a second port 12g. Diaphragm valve 10 may be connected in a fluid flow line such that fluid would typically flow, when the valve is open, in through inlet passage 12b and first port 12f into chamber cavity 12d, and out through second port 12g and outlet passage 12c. Main valve body 12 defines a valve axis A. Chamber cavity 12d is delimited by a generally cylindrical surface 12h extending symmetrically about axis A, and a substantially planar surface 12i which is blended with cylindrical surface 12h by a rounded portion surface 12j. Inlet port 12f is provided in planar surface 12i. Inlet port 12f is substantially circular and also extends symmetrically about axis A.

Elongated valve member 20 includes a poppet 26, an annular washer 28, and a stem 30 which are mutually connected by means of a threaded rod member 32 which extends through a bore 34 in stem 30 and a central aperture 36 of washer 28, and which is screwed into a threaded bore 38 of poppet 26. Washer 28 is interposed between stem 30 and poppet 26. Elongated valve member 20 extends along axis A through annular diaphragm 18. Elongated valve member 20 is adapted for moving along axis A between closed and open positions, as will be described hereinafter.

Figure 4:
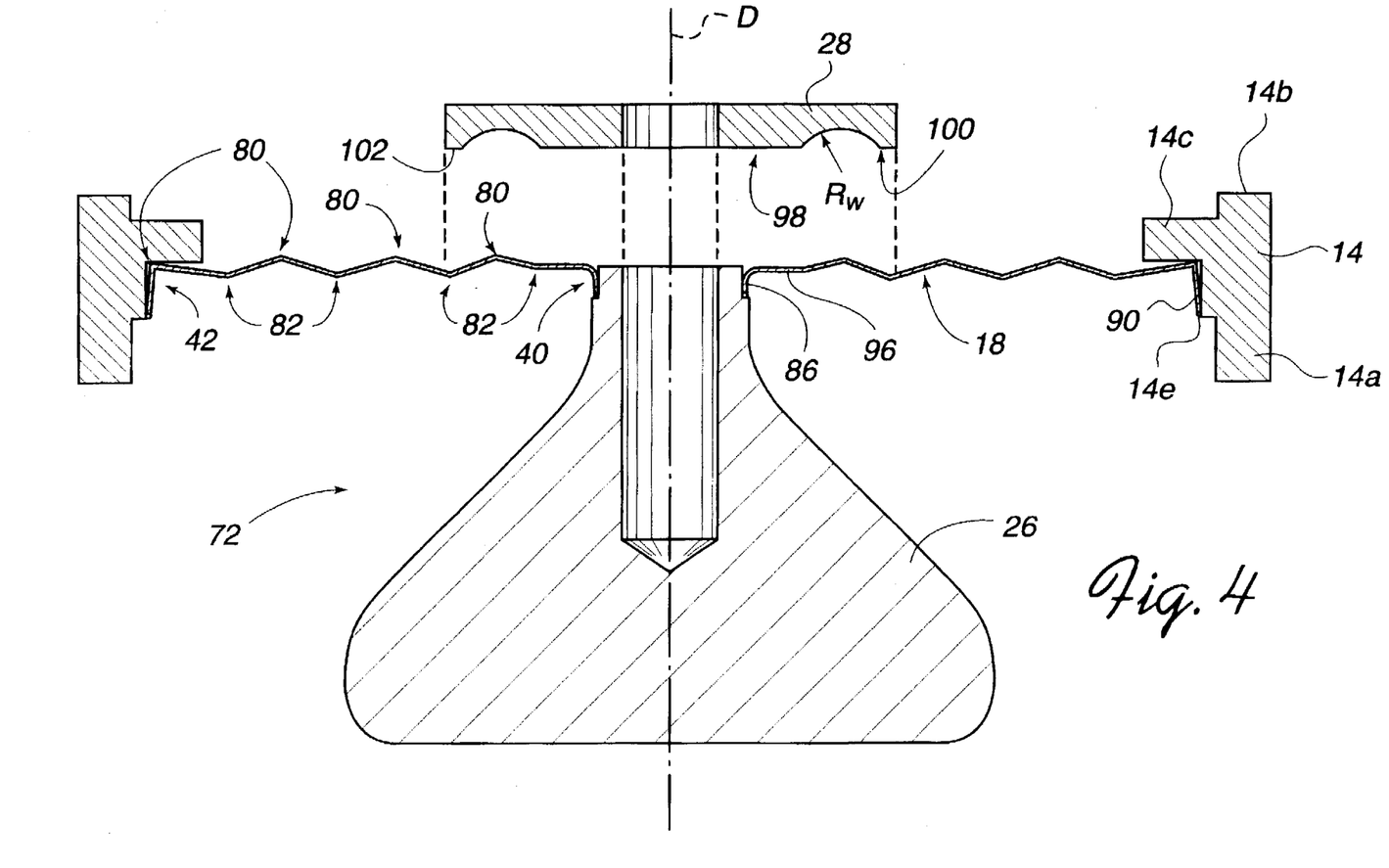
FIG. 4 is an enlarged cross-sectional elevation view of a diaphragm assembly of the valve of FIG. 3.

With additional reference to FIG. 4, annular diaphragm 18 has a central axis D, an inner periphery 40 welded to poppet 26, and an outer periphery 42 welded to ring member 14. Central axis D of annular diaphragm 18 coincides with axis A of diaphragm valve 10. The weldment comprising main valve body 12, ring member 14, annular diaphragm 18, and elongated valve member 20 is such as to provide a hermetic seal for chamber cavity 12d of the valve body.

Valve drive mechanism 22 is coupled to valve member 20 for driving valve member 20 along axis A between a closed position in which poppet 26 is in a sealing engagement relative to first port 12f and an open position in which poppet 26 is not in a sealing engagement relative to first port 12f.

An annular retainer 44 is affixed to ring member 14 and is provided with a central hexagonal aperture 46 through which valve member 20 extends. Stem 30 of valve member 20 includes a hexagonal flange portion 48 and a cylindrical portion 50 having a threaded exterior surface. Hexagonal aperture 46 and hexagonal flange 48 together form cooperating surfaces which allow movement of valve member 20 along axis A while preventing rotation of valve member 20 about axis A. As will be appreciated by those skilled in the art, such axial movement of valve member without rotation may be achieved by differently shaped cooperating surfaces between retainer 44 and valve member 18.

Bonnet 24 partially surrounds annular retainer 44 and is welded to ring member 14. In particular, bonnet 24 includes a cylindrical flange 24a aligned with and welded to a cylindrical flange 14b of ring member 14. The weld between bonnet 24 and ring member 14 may be such as to fully penetrate to weld and fix annular retainer 44 to bonnet 24 and ring member 14. As seen in the figures, flanges 14b and 24a include mutually facing and connected flat surfaces, however such flanges may include mating stepped surfaces which aid in alignment of bonnet 24 and ring member 14. Similarly, flanges 14a and 12a may also include mating stepped surfaces for easy alignment of ring member 14 and main valve body 12.

Valve drive mechanism 22 includes a driver 52 provided with a threaded bore 54 which engages the threaded exterior surface of cylindrical portion 50 of stem 30. Both driver 52 and cylindrical portion 50 extend through a central aperture 56 of bonnet 24.

Driver 52 includes a flange portion 58 which is disposed between bonnet 24 and retainer 44 such that driver 52 is free to rotate about axis A but is prevented from moving along axis A. Handle 16 is coupled to driver 52 by means of a set screw with a conical tip which may be screwed in bore 16a of handle to engage a complementarily shaped conical seat 52a drilled in driver 52 such that a rotation of handle 16 urges a like rotation of driver 52.

Handle 16 includes a central aperture 62 in which a cap 64, attached to rod member 32 and covering the head of rod member 32, is arranged. The degree of protrusion of cap 64 relative to the surface of handle 16 provides an indication of the position (open or close) of valve member 20.

Poppet 26 is arranged for axial movement inside chamber cavity 12d, while stem 30 extends outside of chamber cavity 12d. Rotation of handle 16 moves valve member 20 along axis A between a closed position, in which a seal arrangement 70 arranged proximate first port 12f is engaged by poppet 26 so as to hermetically seal first port 12f, and an open position in which poppet 26 is not engaged with seal arrangement 70 so as to permit fluid flow through first port 12f. Seal arrangement 70 will be described in more detail hereinafter with particular reference to FIGS. 9–12.

An important feature of the invention described thus far is the weldment between various parts of diaphragm valve 10. In particular, the weldment comprising main valve body 12, ring member 14, diaphragm 18, and valve member 20 provide a reliable hermetic seal for chamber cavity 12d in an extremely cost-effective manner while using a limited number of parts and employing relatively inexpensive welding techniques. Welding of bonnet 24 to ring member 14 provides further over-all cost efficiency for diaphragm valve 10, however the reliable hermetic sealing of chamber cavity 12d is already provided by the weld connections between ring member 14 and main valve body 12, and by the weld connections between the inner and outer peripheries of diaphragm 18 and respectively valve member 20 and ring member 14.

According to a preferred method of assembly of the various parts of diaphragm valve 10, inner periphery 40 of diaphragm 16 is welded to poppet 26 and outer periphery 42 of diaphragm 18 is welded to ring member 14 to form a diaphragm/poppet/ring member assembly 72 (FIG. 4). These weldments are easily performed since them is little structure to block access for welding tools.

Assembly 72 is then arranged so that ring member 14 is aligned with main valve body 12 with poppet 26 arranged in chamber cavity 12d, and ring member 14 is then welded to main valve body 12. These simple operations provide a reliable hermetic seal for chamber cavity 12d substantially at mouth 12e. It is seen that the weld connections of diaphragm 18 respectively to ring member 14 and valve member 20 are arranged essentially inside or facing chamber cavity 12d. In conventional diaphragm valves, it is nearly impossible to weld the diaphragm to the valve body "inside" the valve chamber cavity so as to provide a hermetic seal for the valve chamber cavity since access for welding is extremely limited.

After washer 28 and stem 30 are connected to poppet 26, and retainer 44 is arranged over diaphragm 18, and driver 52 is arranged over retainer 44, bonnet 24 is aligned with ring member 14 and welded thereto, and handle 24 is attached to driver 52. The assembly arrangement of threaded rod member 32, bore 34 in stem 30, aperture 36 in washer 28, and threaded bore 38 of poppet 26 permits poppet 26 to be connected to washer 28 and stem 30 such that diaphragm 18 is not subjected to possibly damaging rotational shear stresses, since a tightening of threaded rod member 32 provides only an axial relative movement between the facing surfaces of washer 28 and poppet 26 and diaphragm 18.

Main valve body 12, ring member 14, handle 16, bonnet 24, poppet 26, stem 30, rod member 32, retainer 44, and driver 52 are all preferably made of 300 series stainless steel. Washer 28 is preferably made of Teflon. Main valve body 12, ring member 14, and bonnet 24 are preferably connected by performing an inert gas TIG weld operation with back purge pumping of a pure (preferably in excess of 99.9999% purity) argon environment.

The preferred structure and welding of diaphragm 18 will now be described with particular reference to FIGS. 4–6. Annular diaphragm 18 is a unitary structure provided with a plurality of concentric ridges 80 and valleys 82 which form a corrugation. Diaphragm 18 further includes an inner rim 84 at inner periphery 40 and an inner flange 86 extending from inner rim 84, and an outer rim 88 at outer periphery 42 and an outer flange 90 extending from outer rim 88.

Diaphragm 18 is preferably made of a metallic material chosen from the group consisting essentially of nickel based stainless steels and 300 series stainless steels. Most preferably, diaphragm 18 is made of a nickel based stainless steel with a nickel content of at least 40 percent by weight. An appropriate material for diaphragm 18 is a heat treatable Nickel-Iron Alloy known as Precision C (Ni-Span) available from Hamilton Precision Metals, Inc. of Lancaster Pa. In a preferred method of manufacturing diaphragm 18, Precision C material in a full dead soft annealed condition, without having been cold-rolled, is formed into the shape of diaphragm 18 including inner flange 86 and outer flange 90. Precision C material in such state permits an easy formation of inner flange 86 and outer flange 90. After forming, diaphragm 18 is heat treated at approximately 1250° F. for about 3.5 hours, and then is air cooled such that the yield strength of diaphragm 18 is in excess of 110,000 psi.

Figure 5:
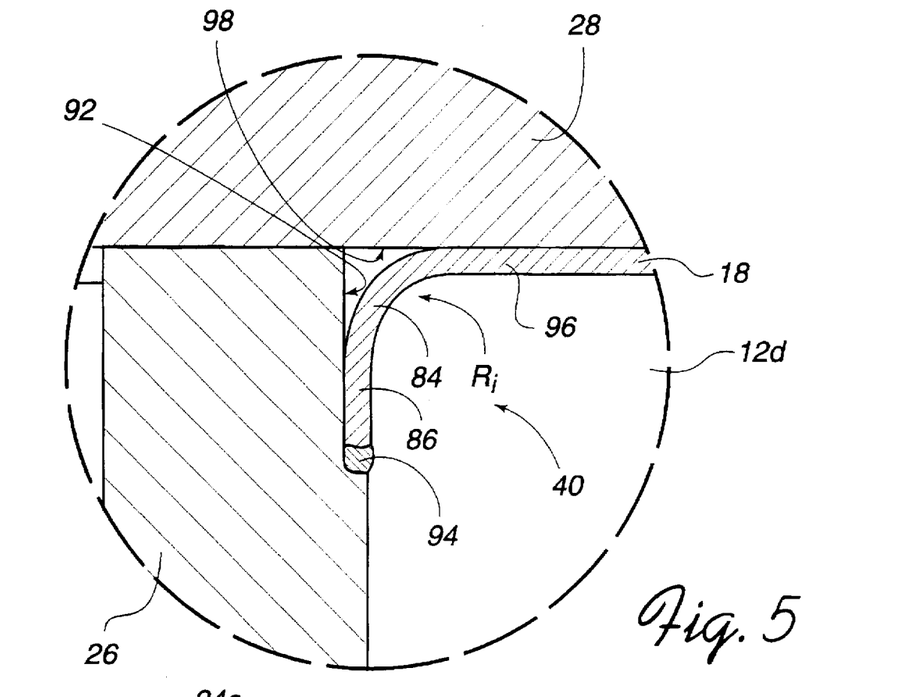
FIG. 5 is an enlarged close-up view at the inner periphery of the diaphragm of the valve of the preceding Figures.

Inner flange 86 is accommodated in a cylindrical groove 92 of poppet 26, while the respective thicknesses of inner flange 86 and groove 92 are essentially the same (FIG. 5). A weld 94 connects the free edge of inner flange 86 to a stepped portion defined by groove 92. Weld 94 extends circumferentially about axis D so as to provide a completely hermetic seal connection between diaphragm 18 and valve member 20 at inner periphery 40. Inner flange 86 extends substantially parallel to axis D, and inner rim in cross-section extends substantially in a circular arc having a radius of curvature $R_i$.

Diaphragm 18 further includes a substantially planar portion 96 proximate inner rim 84. The dimensions of groove 92 and diaphragm 18 at inner periphery 40 are such that planar portion 96 rests against the annular surface 98 of washer 28 facing diaphragm 18 when washer 28 is connected flush with poppet 26 without inner periphery 40 of diaphragm 18 being substantially subjected to any stress.

Annular surface 98 of washer 28 is substantially planar but is provided with an annular groove 100 adapted such that a first most inner ridge 80 of the corrugation of diaphragm 18 is accommodated in annular groove 100 without first ridge 80 making contact with surface 98 in all positions of valve member 20. Annular groove 100 in cross-section preferably extends over a circular arc of radius $R_w$. Annular surface 98 of washer 28 includes a peripheral surface portion 102 adapted to engage a first valley 82 of the corrugation of diaphragm 18. Annular surface 98 provides an excellent stress protection of the welded connection of inner periphery 40 of diaphragm 18 to poppet 26 since the flexure of diaphragm 18 as valve member 20 moves along axis A is moved away from axis A and away from the location of weld 94. While surface 98 is provided on washer 28, a similarly shaped surface could be provided directly on stem 30 facing poppet 26, which would eliminate the need for washer 28. The use of washer 28 is preferred however due to its material properties.

Figure 6:
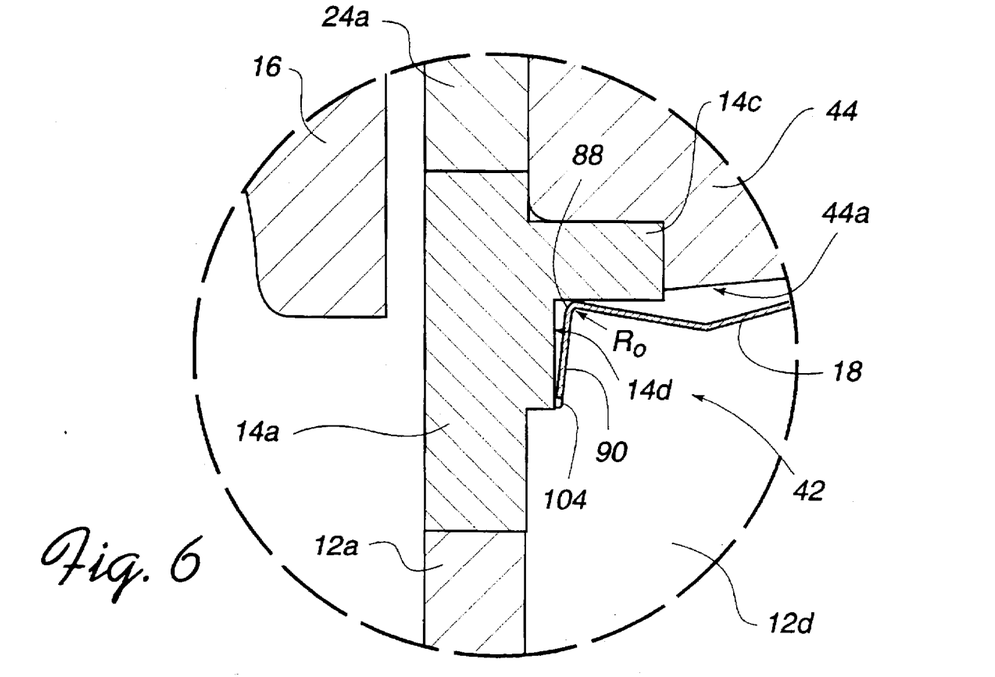
FIG. 6 is an enlarged close-up view at the outer periphery of the diaphragm of the valve of the preceding Figures.

With reference to FIGS. 4 and 6, ring member 14 further includes an internally projecting flange portion 14c, a cylindrical surface 14d extending about axis A, and a circumferential corner edge 14e. A weld 104 connects the free edge of outer flange 90 to corner edge 14e of ring member 14. Weld 104 extends circumferentially about axis D so as to provide a completely hermetic seal connection between diaphragm 18 and ring member 14 at outer periphery 42. When assembly 72 is connected in diaphragm valve 10 (FIG. 3), flange portion 14c is arranged over a face of diaphragm 14 which is opposite chamber cavity 12d. In the non-flexed condition of diaphragm 18, outer flange 90 preferably extends at an angle in the range of about 4.5 degrees to 5.5 degrees with respect to axis D, and outer rim 88 in cross-section extends substantially in a circular arc having a radius of curvature $R_o$. Most preferably, outer flange 90 extends at an angle of about 5 degrees with respect to axis D. The slightly flared structure of outer flange 90 provides improved forming during the manufacture of diaphragm 18 as described previously.

The dimensions of cylindrical surface 14d, flange portion 14c, and diaphragm 18 at outer periphery 42 are such that outer rim 88 contacts and rests against flange portion 14c when diaphragm 18 is in the non-flexed condition without outer periphery 40 of diaphragm 18 being substantially subjected to any stress.

Welds 94 and 104 are preferably formed in an electron beam (EB) welding technique under vacuum and at low energy so as to form the completely hermetic seal connections for diaphragm 18. The thickness of welds 94 and 104 are substantially equal to the thickness of diaphragm 18. Location of welds 94 and 104 respectively at the stepped portion of groove 92 and corner edge 14e of cylindrical surface 14d facilitates alignment and welding of diaphragm 18 in the welding operation.

The corrugation of diaphragm 18 facilitates flexure of diaphragm as valve member 20 is moved along axis A. Diaphragm 18 may therefore have an increased thickness to increase the pressure capability of diaphragm 18, while still being sufficiently flexible.

Figure 6A:
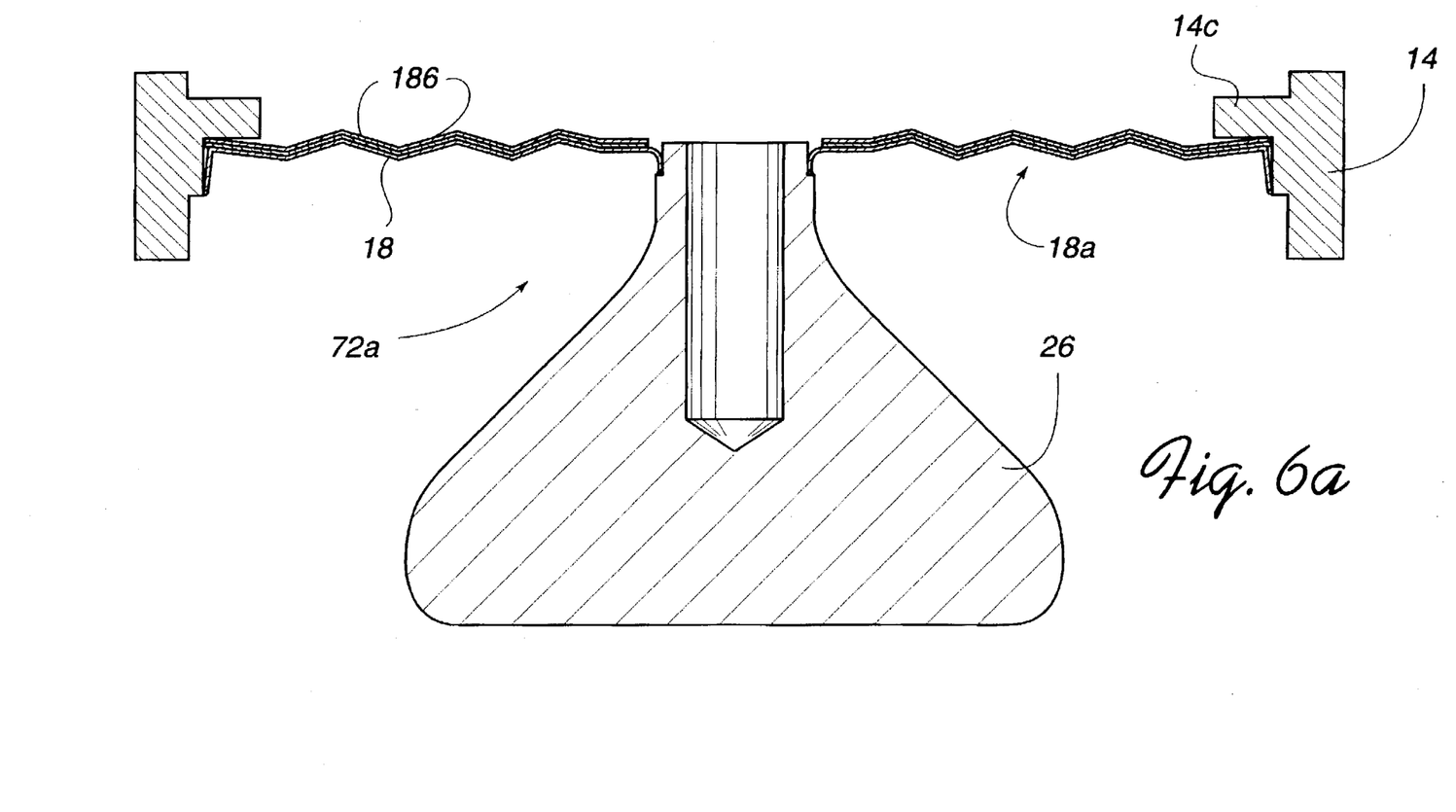
FIG. 6a is an enlarged cross-sectional elevation view similar to FIG. 4 showing another embodiment of a diaphragm assembly in accordance with the present invention.

In order to further increase the pressure capability of diaphragm valves, the present invention provides a diaphragm having stacked disks. FIG. 6a shows one embodiment of a stacked disk diaphragm according to the present invention. Stacked disk diaphragm 18a includes diaphragm 18, welded to ring member 14 and poppet 26, as described previously, and at least one stacked annular disk 18b stacked over diaphragm 18 and provided with a plurality of concentric ridges and valleys to provide a corrugation that matches the corrugation of diaphragm 18. In a preferred method of assembly, two annular disks 18b are positioned over diaphragm 18 without connecting annular disks 18b to diaphragm 18. Diaphragm 18 is then welded to ring member 14 and poppet 26 to form a stacked diaphragm/poppet/ring member assembly 72a, such that outer peripheral portions of annular disks 18b are interposed between flange portion 14c of ring member 14 and outer periphery of diaphragm 18. When washer 28 and stem 30 are connected to poppet 26, inner peripheral portions of annular disks 18b are interposed between surface 98 and inner periphery of diaphragm 18. Annular disks 18b allow to further increase the pressure capability of diaphragm 18 while maintaining sufficient flexibility of stacked disk diaphragm 18a.

The provision of inner rim 84 and outer rim 88 advantageously reduces stress on weld 94 and weld 104 when diaphragm 18 flexes as valve member 20 moves to different positions along axis A, since a large portion of the induced bending stresses to diaphragm 18 are concentrated at inner rim 84 and outer rim 88. Larger radiuses $R_i$ and $R_o$ are preferred for better distribution of stress at inner rim 84 and outer rim 88. A maximized radius $R_i$ at inner periphery 40 is particularly important since diaphragm 18 sees more deflection at portions thereof closer to axis A. Preferably, radiuses $R_i$ and $R_o$ are in the range of 0.010 inch to 0.020 inch. Most preferably, radiuses $R_i$ and $R_o$ are about 0.015 inch.

In one preferred embodiment in which diaphragm 18 is made of Precision C material as described above, the thickness of diaphragm 18 is in the range of 0.045 inch to 0.055 inch, radiuses $R_i$ and $R_o$ are in the range of 0.010 inch to 0.020 inch, outer flange 90 extends at an angle in the range of about 4.5 degrees to 5.5 degrees with respect to axis D, and inner flange 86 extends substantially parallel to axis D. Most preferably, the thickness of diaphragm 18 is about 0.050 inch, radiuses $R_i$ and $R_o$ are about 0.015 inch, outer flange 90 extends at an angle of about 5 degrees with respect to axis D, and inner flange 86 extends substantially parallel to axis D. For these preferred and most preferred embodiments of diaphragm 18, the number of concentric ridges 80 is preferably in the range of 2 to 4 while the number of concentric valleys 82 is in the range of 2 to 4, while the height between ridges 80 and valleys 82 is in the range of 0.015 inch to 0.025 inch. Most preferably, the number of concentric ridges 80 and the number of concentric valleys 82 are both four, and the height between ridges 80 and valleys 82 is about 0.020 inch.

The preferred and most preferred embodiments of diaphragm 18 just described are preferably formed in assembly 72 in which the diameter of cylindrical surface 14d of ring member 14 is in the range of 1.434 inch to 1.436 inch, the height of cylindrical surface 14d is in the range of 0.077 inch to 0.079 inch, the diameter of cylindrical groove 92 of poppet 26 is in the range of 0.221 inch to 0.223 inch, the height of cylindrical groove 92 is in the range of 0.032 inch to 0.038 inch, and the cross-sectional thickness of cylindrical groove 92 is in the range of 0.007 inch to 0.011 inch, while most preferably the diameter of cylindrical surface 14d of ring member 14 is about 1.435 inch, the height of cylindrical surface 14d is about 0.078 inch, the diameter of cylindrical groove 92 of poppet 26 is about 0.220 inch, the height of cylindrical groove 92 is about 0.035 inch, and the cross-sectional thickness of cylindrical groove 92 is about 0.009 inch. For these preferred and most preferred embodiments of assembly 72, preferably the depth of groove 100 of washer 28 is in the range of 0.020 inch to 0.030 inch, the diameter of the center of groove 100 is in the range of 0.485 inch to 0.495 inch, the radius $R_w$ of groove is in the range of 0.057 inch to 0.067 inch, and the outer diameter of surface 98 of washer is in the range of 0.615 inch to 0.625 inch, while most preferably the depth of groove 100 of washer 28 is about 0.025 inch, the diameter of the center of groove 100 is about 0.490 inch, the radius $R_w$ of groove is about 0.062 inch, and the outer diameter of surface 98 of washer is about 0.620 inch.

While the foregoing describes an annular diaphragm through which an elongated valve member extends, the invention is also operable in diaphragm valves which include circular diaphragms which are flexibly movable in a central axis direction between closed and open positions. As will be appreciated by those skilled in the art, in its closed position the circular diaphragm may engage substantially directly with an inlet port of the diaphragm valve for hermetic sealing thereof, or alternatively a sealing poppet may be arranged in the chamber cavity which is engaged by the central portion of the circular diaphragm in its closed position such that the sealing poppet substantially makes hermetic sealing contact with the inlet port of the diaphragm valve. In both cases, a stem arranged outside of the valve chamber cavity may be provided for engagement with the central portion of the circular diaphragm such that the central portion flexibly moves in a central axis direction between closed and open positions. The diaphragm valve including such a circular diaphragm could have a ring member welded to a main valve body, and an outer periphery of the circular diaphragm welded to the ring member, in a manner as described previously. In such a case, the weldment including the main valve body, the ring member, and the circular diaphragm would provide a reliable hermetic seal for the chamber cavity of the diaphragm valve.

Figure 7:
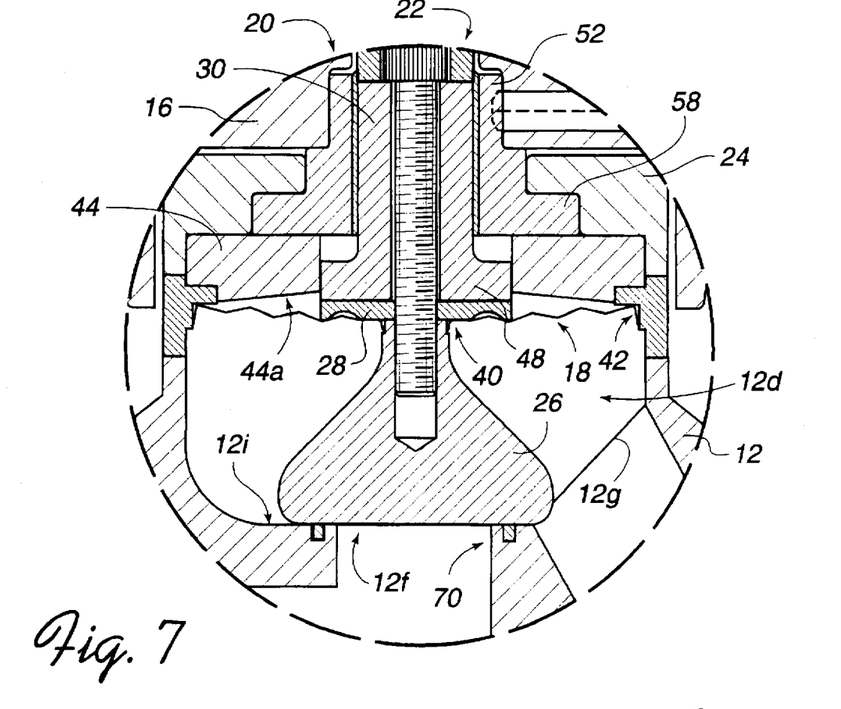
FIG. 7 is an enlarged cross-sectional view of the valve of FIG. 3 with the valve poppet in a closed sealing position.
Figure 8:
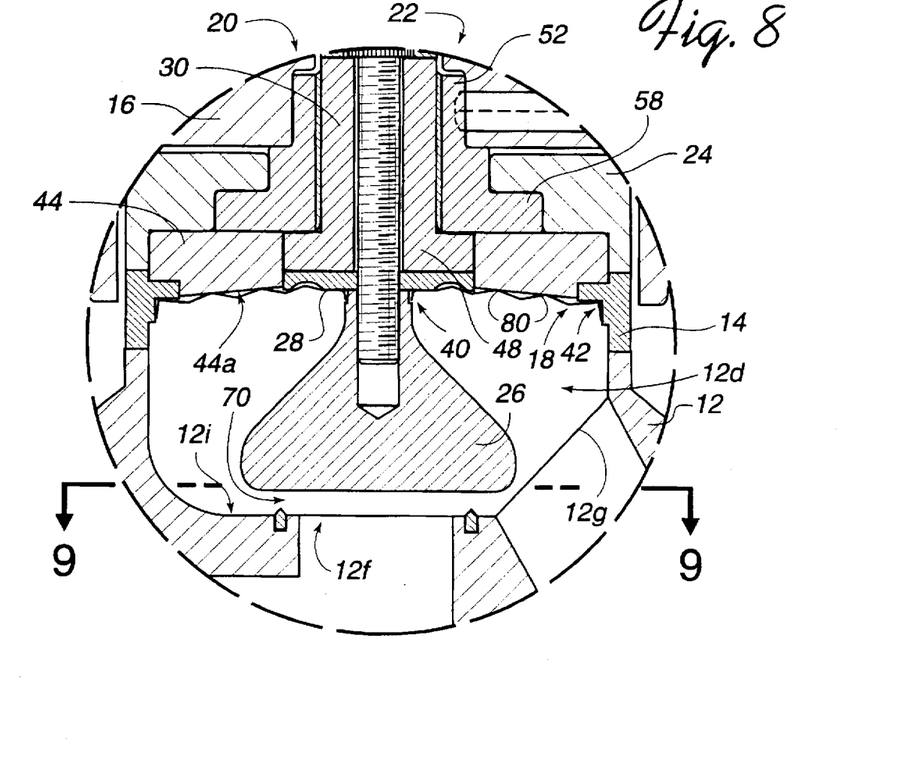
FIG. 8 is an enlarged cross-sectional view of the valve of FIG. 3 with the valve poppet in an open non-sealing position.
Figure 9:
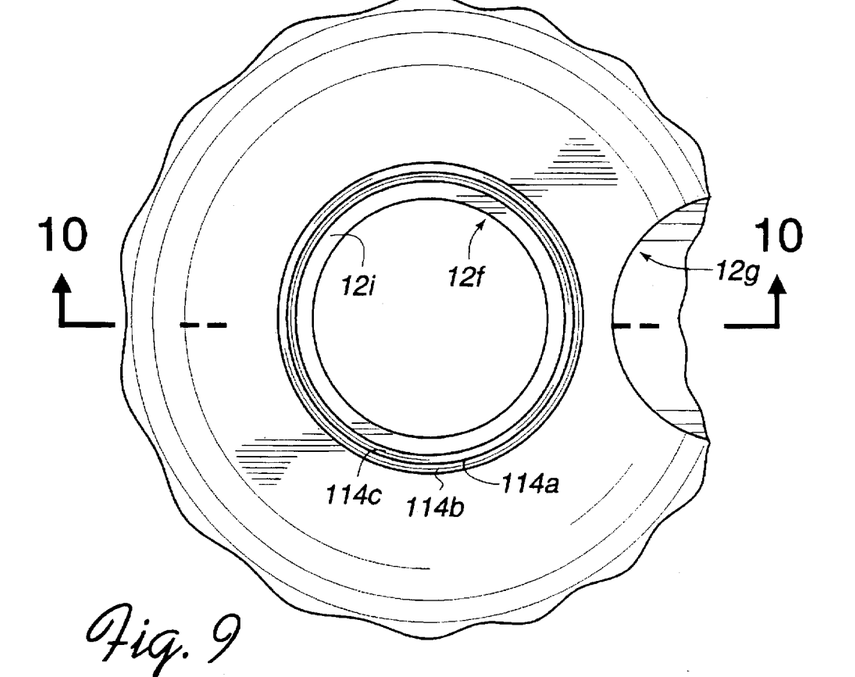
FIG. 9 is an enlarged plan view of a valve seal arrangement taken along line 9—9 of FIG. 8.

FIGS. 7 and 8 illustrate valve diaphragm 10 with valve member 20 respectively in its fully closed sealing position and in its fully open non-sealing position. Planar surface 12i of chamber cavity 12d of main valve body 12 acts to stop further movement of valve member 20 past its fully closed position (FIG. 7), while flange 58 of driver 52 acts to stop further movement of valve member 20 past its fully open position by engagement with flange 48 of stem 30 (FIG. 8).

In both the open and closed positions, the shape of diaphragm 18 near inner periphery 40 remains essentially unchanged due to surface 98 of washer 28. In particular, planar portion 96 remains substantially planar, the first most inner ridge 80 remains accommodated in groove 100 without engaging the surface of groove 100, and the two most inner valleys 82 remain engaged substantially at the edges of groove 100 at surface 98.

In the open position, ridges 80 of the corrugation of diaphragm 18 engage with a surface 44a of retainer 44 which faces diaphragm 18. Surface 44a of retainer 44 thereby provides support to diaphragm 18 when valve member 20 is in its open position, so as to increase the pressure capability of diaphragm valve 10 by increasing the pressure/load resistance of diaphragm 18. Surface 44a is sloped and preferably extends at an angle between about 4.5 degrees and 5.5 degrees with respect to a plane which is perpendicular to axis A. Most preferably, sloped surface 44a has an angle of about 5 degrees (in the range of 4.9 to 5.1 degrees). In the most preferred embodiments described herein, diaphragm valve 10 has been found to be capable of adequately handling pressures of at least 375 psi. While retainer 44 admirably provides sloped surface 44a for supporting diaphragm 18, it is envisaged that flange portion 14c of ring member 14 could internally protrude farther so as to itself provide a sloped surface such as to function in a manner similar to sloped surface 44a. Flange portion 14c of ring member 14 could extend even far enough to provide a central aperture with an internal surface such as to function in a manner similar to central aperture 46 of retainer 44. Alternatively, retainer 44 could be formed to include a portion which replaces the functionality of flange portion 14c.

Seal arrangement 70 will now be described with particular reference to FIGS. 9–12. Seal arrangement 70 includes a circumferential groove 110 provided in planar surface 12i of main valve body 12 and extending so as to surround inlet port 12f, and an elastic sealing material 112 which is at least partially disposed in circumferential groove 110. Sealing material 112 includes an extension portion 114 partially extending from circumferential groove 110 past surface 12i in a non-engaged and non-compressed state i.e. when valve member 20 is not in its closed position.

Circumferential groove 110 is configured so as to provide at least one void 116,117 between extension portion 114 and sidewall portions 110a,110b of groove 110 in a non-compressed state of portion 114 (FIG. 11), such that material of extension portion 114 can at least partially fill void 116,117 when valve member 20 is in its closed position (FIG. 12), and such that extension portion 114 can return to substantially its original configuration when valve member 20 returns to its open position.

Sealing material 112 is preferably a single polymer chlorotrifluoroethylene with zero water absorption characteristics per ASTM D570. Most preferably, sealing material is Kel-F 81 material available from 3M Corporation of Minneapolis Minn.

Figure 11:
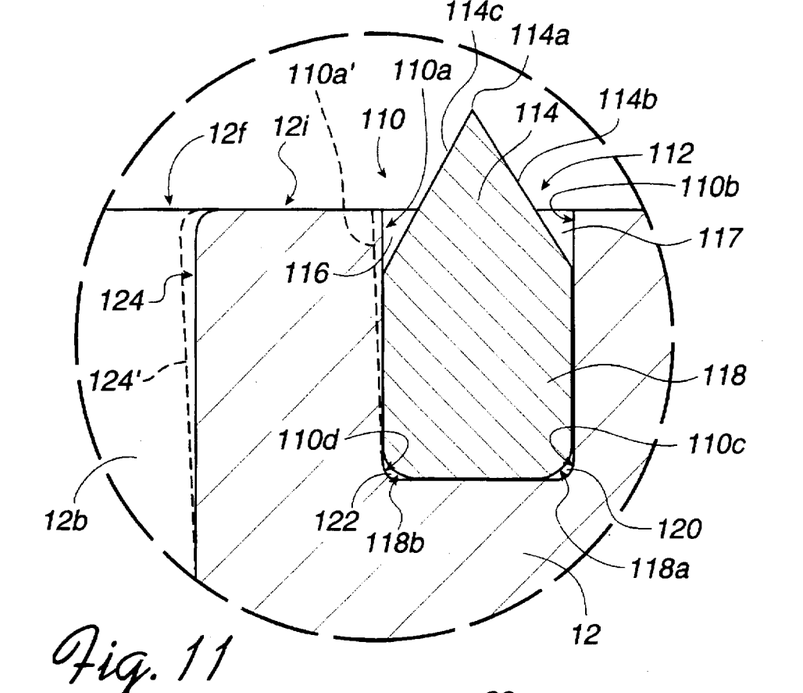
FIG. 11 is an enlarged cross-sectional elevational view of the valve seal arrangement of FIG. 9, showing deformation about the valve port after a swage operation.
Figure 12:
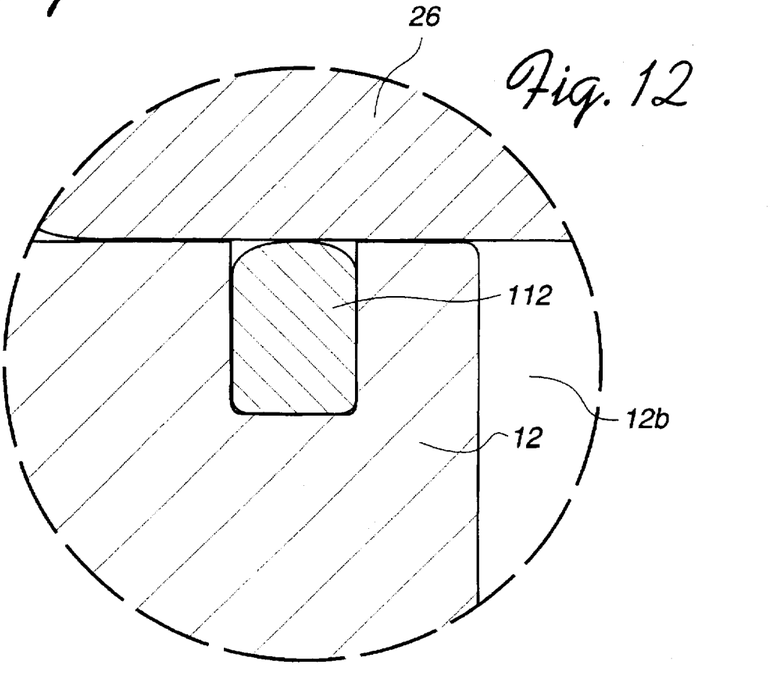
FIG. 12 is an enlarged cross-sectional elevational view of the valve seal arrangement of FIG. 9 with the sealing material engaged by the valve poppet and in an elastically compressed state.

Sealing material 112 is an annular sealing ring having a base portion 118 and extension portion 114. Base portion 118 is substantially rectangularly shaped in cross-section i.e. with four sides having sharp or curved corners, and extension portion 114 is substantially wedge shaped in cross-section i.e. with a pair of converging sides extending past surface 12i.

Groove 110 is also substantially rectangularly shaped in cross-section i.e. with four sides having sharp or curved corners. Base portion 118 engages sidewall portions 110a of groove 110 (FIG. 11). Base portion 118 has removed portions or rounded corners 118a,118b so as to provide void space 120,122 between corners 118a,118b and rounded corners 110c,110d of groove 110, in order to facilitate insertion of elastic sealing material 112 in groove 110.

Extension portion 114 defines converging sloping surfaces 114b,114c extending beyond surface 12i and a circumferential apex 114a formed by surfaces 114b,114c. Sloped surfaces 114b,114c preferably have an included angle relative to apex 114a of between about 29.5 degrees and 30.5 degrees, and most preferably of about 30 degrees.

While the preferred form and shape of groove 110 and elastic sealing material 112 have been described herein, it will be appreciated that grooves and sealing materials of other shapes and forms may be employed in a manner such that the sealing material disposed in the groove has a dimension that is greater than the groove depth so that a portion of the sealing material extends out of the circumferential groove past the surface in which the groove is circumferentially provided about a port, and such that a gap is provided in the groove proximate the surface. The groove should have a substantially constant groove depth, and the sealing material should be chosen such that at least a portion of the extending portion can be elastically compressed into the gap by the exertion of a force on such extending portion, substantially without any permanent plastic deformation so that the sealing material will return to its original form upon removal of the exertion of such force. In this manner, a seal arrangement is provided which is extremely durable and reliable even after many cycles of application and removal of the sealing force.

Figure 10:
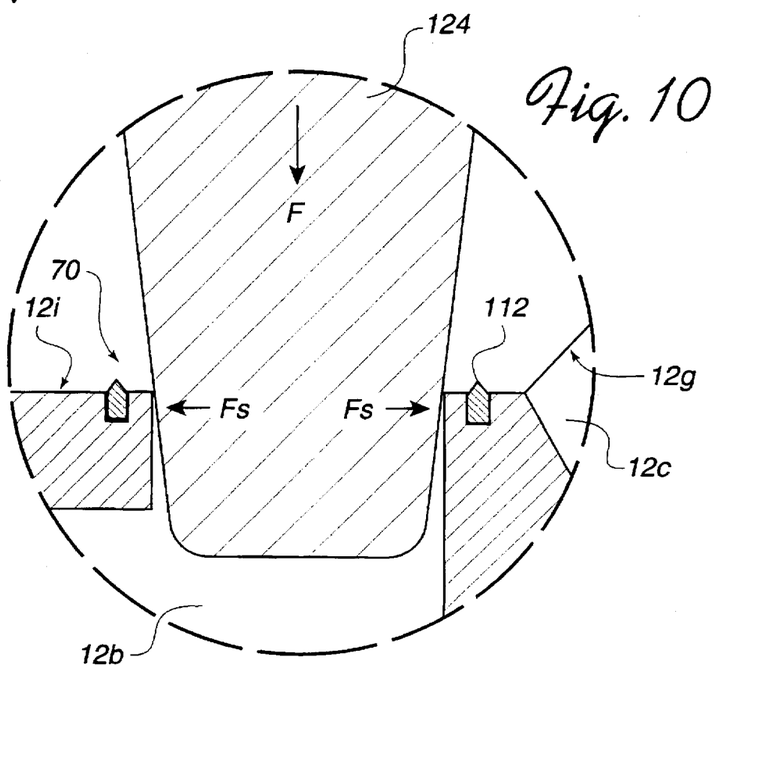
FIG. 10 is an enlarged cross-sectional elevation side view of the valve seal arrangement of FIG. 9, showing the use of a swage tool in a manufacturing step of the valve seal.

Groove 110 has been swaged such that at least a portion of sidewall 110a provides a clamping force on sealing material 112 to retain it within groove 110 after it has been inserted within groove 110. FIG. 11 shows original sidewall 110a' of groove 110 and swaged sidewall 110a. FIG. 10 illustrates a preferred method of swaging for groove 110. After insertion of sealing material 112 in groove 110, a conically shaped swage tool 124 is engaged in inlet port 12b and force F is exerted on swage tool 124 to create swaging forces $F_s$ on groove 110 such that at least a deformed portion of sidewall 110a is formed to grip and retain sealing material 112. FIG. 11 also illustrates an original sidewall portion 124' of inlet port 12b and a deformed sidewall portion 124 of inlet port 12b which has been formed after the swaging operation.

Figure 13:
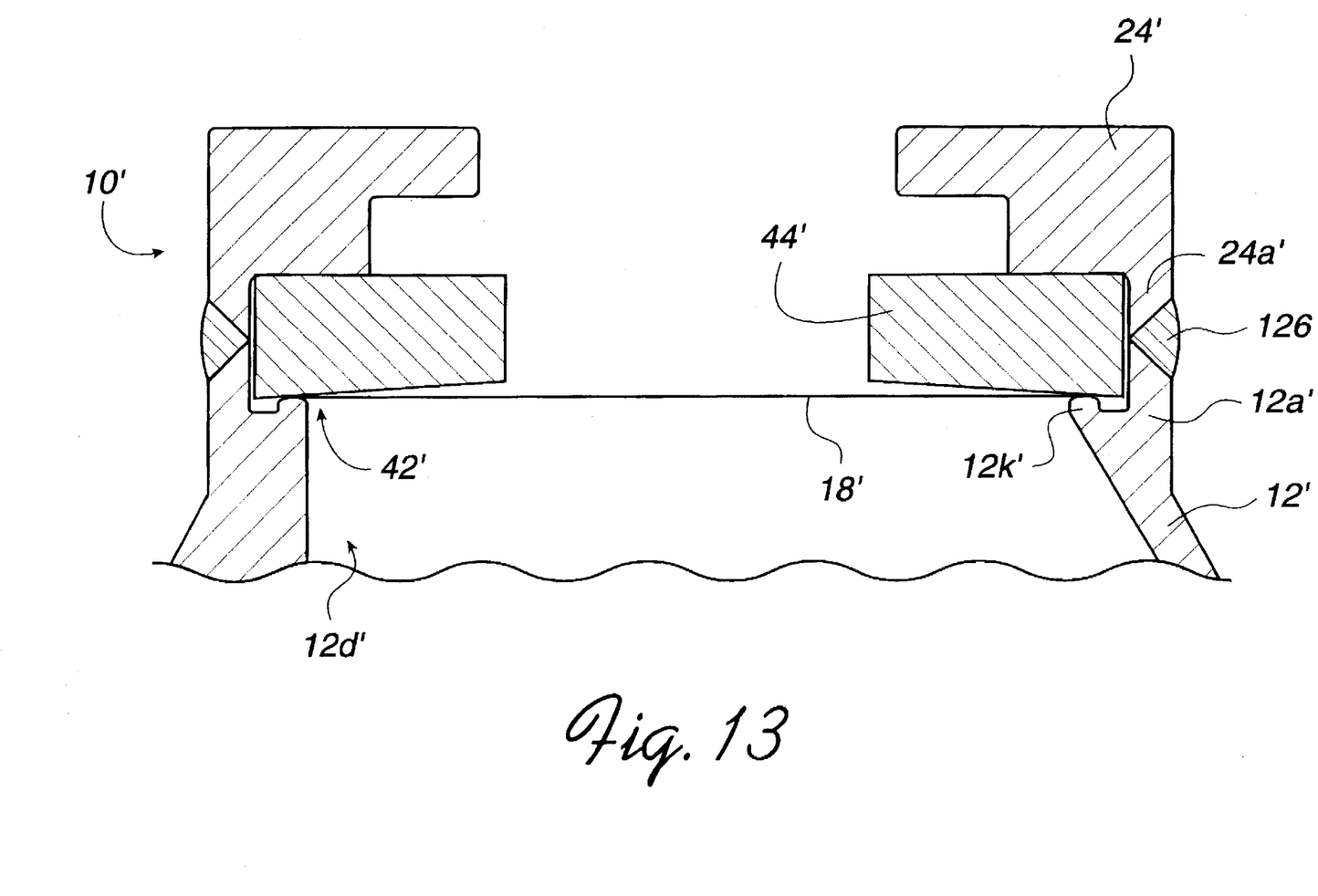
FIG. 13 is a cross-sectional elevation view of a bonnet to valve body weld connection of another embodiment of a diaphragm valve in accordance with the present invention.

FIG. 13 illustrates another embodiment of a diaphragm valve according to the present invention, similar to diaphragm valve 10 described previously except that ring member 14 has been eliminated. A bonnet to valve body weld connection 10' includes a bonnet 24' welded directly to a main valve body 12'. Main valve body 12' may be completely similar to valve body 12 described previously except that it includes a flange 12a' welded directly to bonnet 24', and an internally projecting clamp portion 12k'. A diaphragm valve 18' includes an outer periphery 42' which is clamped between clamp portion 12k' and a retainer 44'. Diaphragm 18' in this case is a substantially planar circular diaphragm.

In a preferred method of clamping outer periphery 42' between retainer 44' and main valve body 12', outer periphery 42' is arranged between clamp portion 12k' and retainer 44', bonnet 24' is arranged over retainer 44' such that flange 24a' of bonnet 24' makes contact with flange portion 12a' and retainer 44' is positioned between bonnet 24' and clamp portion 12k' with outer periphery 42' of diaphragm 18' arranged between retainer 44' and clamp portion 12k'. Flange 24a' of bonnet 24' is then preferably pressed against flange 12a' of valve body 12', and then flange 24a' is simultaneously welded directly to flange 12a', preferably by using a TIC welding technique, to form weld 126. The welding operation initially expands the material of flanges 12a' and 24a', and upon cooling such material of flanges 12a' and 24a' contracts to produce induced stresses in such material which provides a clamping force on outer periphery 42' of diaphragm 18' between retainer 44' and clamp portion 12k'. In the preferred method, the initial pressing of flange 24a' to flange 12a' provides an initial clamping force on outer periphery 42', and the welding provides a final clamping force on outer periphery 42' which is even greater than the initial clamping force.

The clamping force on outer periphery 42' of diaphragm 18' is such as to provide a completely hermetic seal for chamber cavity 12d' at outer periphery 42'. Since diaphragm 18' is circular in shape clamping of outer periphery 42' alone provides the hermetic seal for chamber cavity 12d'.

Diaphragm 18' could be substituted with an annular diaphragm in which case the inner periphery thereof could be welded to a valve member for example in a manner as described previously so as to also provide a completely hermetic seal for chamber cavity 12d' at the inner periphery. Bonnet 24' and retainer 44' are shaped so as to support a valve member and a valve drive mechanism similar to those elements described previously. Furthermore, bonnet 24' could be provided with a portion which engages directly on outer periphery 42' without the interposition of retainer 44' such that outer periphery 42' is sealingly clamped between such bonnet portion and clamp portion 12k' after creating weld 126. In the embodiment of FIG. 13, just as in various embodiments of the preceding Figures, a diaphragm valve has been provided which includes a flexible diaphragm coupled to the valve body proximate its outer periphery, and which also includes a bonnet covering the diaphragm and being non-releasably coupled to the valve body by at least one weld such that the diaphragm is non-releasably secured within the bonnet.

The invention as described herein is particularly useful for controlling fluid flow in apparatus for manufacturing semiconductors where high purity gases are being transported and leakage must be avoided.

Although the invention has been described with particular reference to diaphragm valves, it will be appreciated that the invention has broader applications, and that certain individual features thereof may be used with other types of valves and/or in other environments. To give just one example, while seal arrangement 70 performs admirably in diaphragm valves 10 as described herein, it is envisaged that seal arrangement 70 is useful in any type of assembly where reliable sealing of a port is required.

While this invention has been described in terms of several preferred embodiments, it is contemplated that various alterations and permutations thereof will become apparent to those skilled in the art. It is therefore intended that the appended claims include all such alterations and permutations as fall within the true spirit and scope of the present invention.

I claim:

1. A method of forming a seal between a cavity in a valve body of a diaphragm valve and a port provided in said valve body, comprising:

providing a circumferential groove in a surface of said valve body surrounding said port;

disposing an elastic sealing material in said groove, said sealing material having an extension portion which at least partially extends out of said groove past said surface of said valve body, and said sealing material being configured to provide a void within said groove between said extension portion and a sidewall of said groove; and bringing a valve member into a closed position in which said valve member closes said port and elastically compresses said extension portion such that said extension portion at least partially fills said void within said groove.

2. A method of forming a seal according to claim 1 wherein said sealing material is an annular sealing ring having a base portion and said extension portion, said base portion having a substantially rectangularly-shaped cross-section and said extension portion having a substantially wedge-shaped cross-section.

3. A method of forming a seal according to claim 2 wherein said extension portion includes a circumferential apex defined by converging sloped surfaces.

4. A method of forming a seal according to claim 3 wherein said sloped surfaces have an included angle relative to said apex of between about 29.5 degrees and about 30.5 degrees.

5. A method of forming a seal according to claim 1 wherein said sealing material is comprised of a single polymer chlorotrifluoroethylene.

6. A method of forming a seal according to claim 2 wherein said sealing material is comprised of a single polymer chlorotrifluoroethylene.

7. A method of providing a seal arrangement in a diaphragm valve which includes a port provided in a valve body, the method comprising the steps of:

providing a circumferential groove having a substantially constant groove depth in a surface of said valve body surrounding said port;

disposing a sealing material in said circumferential groove having a dimension that is greater than said groove depth, such that a portion of said sealing material extends out of said circumferential groove past said surface of said valve body, said sealing material being configured to provide a gap within said circumferential groove proximate said surface; and swaging said circumferential groove such that at least a portion of a sidewall of said circumferential groove provides a clamping force on said sealing material to retain said sealing material within said circumferential groove; said gap within said circumferential groove being present after swaging;

whereby at least a portion of said portion of said sealing material can be compressed into said gap by the exertion of a force on said portion of said sealing material that extends out of said groove.

8. A method of providing a seal arrangement according to claim 7 wherein said swaging step includes engaging a cortically shaped swage tool with said port and exerting a force on said swage tool so as to exert a swaging force on said circumferential groove such that said at least a portion of a sidewall of said circumferential groove deforms to grip said sealing material.

9. A method of providing a seal arrangement according to claim 7 wherein said at least a portion of said portion of said sealing material can be compressed elastically into said gap substantially without any permanent plastic deformation and can return to its original form upon removal of the exertion of said force.

10. A method of providing a seal arrangement according to claim 7 wherein said sealing material is an annular sealing ring having a base portion which is substantially rectangularly-shaped in cross-section and an extension portion which is substantially wedge-shaped in cross-section.

11. A method of providing a seal arrangement according to claim 10 wherein said extension portion includes a circumferential apex defined by converging sloped surfaces.

12. A method of providing a seal arrangement according to claim 11 wherein said sloped surfaces have an included angle relative to said apex of between about 29.5 degrees and about 30.5 degrees.

13. A method of providing a seal arrangement according to claim 7 wherein said sealing material is comprised of a single polymer chlorotrifluoroethylene.

14. A method of providing a seal arrangement according to claim 10 wherein said sealing material is comprised of a single polymer chlorotrifluoroethylene.

15. A method of forming a seal between a cavity in a valve body of a diaphragm valve and a port provided in said valve body, said valve having an open position and a closed position, comprising:

providing a circumferential groove in a surface of said valve body surrounding said port;

disposing an elastic sealing material in said groove, said sealing material having an extension portion which extends out of said groove past said surface of said valve body when said valve is in an open position, and said sealing material being configured to provide a void within said groove between said extension portion and a sidewall of said groove;

bringing a valve member into a closed position of said valve in which said valve member closes said port and elastically compresses said extension portion into said groove such that said extension portion partially fills said void within said groove; and bringing said valve member into said open position of said valve in which said valve member opens said port and releases said extension portion from said groove such that said extension portion returns to an original shape substantially without any plastic deformation.

16. A method of forming a seal according to claim 15 wherein said sealing material is an annular sealing ring having a base portion and said extension portion, said base portion having a substantially rectangularly-shaped cross-section and said extension portion having a substantially wedge-shaped cross-section.

17. A method of forming a seal according to claim 16 wherein said extension portion includes a circumferential apex defined by converging sloped surfaces.

18. A method of forming a seal according to claim 17 wherein said sloped surfaces have an included angle relative to said apex of between about 29.5 degrees and about 30.5 degrees.

19. A method of forming a seal according to claim 15 wherein said sealing material is comprised of a single polymer chlorotrifluoroethylene.

20. A method of forming a seal according to claim 16 wherein said sealing material is comprised of a single polymer chlorotrifluoroethylene.

\* \* \* \* \*

UNITED STATES PATENT AND TRADEMARK OFFICE
CERTIFICATE OF CORRECTION

PATENT NO. : 5,725,007
DATED : March 10, 1998
INVENTOR(S) : William L. Stubbs

It is certified that error appears in the above-indentified patent and that said Letters Patent is hereby corrected as shown below:

In column 2, line 25, change "them" to --there--.
In column 2, line 29, change "ting" to --ring--.
In column 6, line 6, change "them" to --there--.

In the Claims
In column 13, line 49, change "cortically" to --conically--.

Signed and Sealed this

Twenty-third Day of June, 1998

Attest:

BRUCE LEHMAN

*Attesting Officer*  *Commissioner of Patents and Trademarks*